(12) United States Patent
Mao

(10) Patent No.: US 12,282,534 B2
(45) Date of Patent: Apr. 22, 2025

(54) INFORMATION PROCESSING APPARATUS, INFORMATION PROCESSING METHOD, AND NON-TRANSITORY RECORDING MEDIUM

(71) Applicant: Shijie Mao, Kanagawa (JP)

(72) Inventor: Shijie Mao, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 207 days.

(21) Appl. No.: 18/049,007

(22) Filed: Oct. 24, 2022

(65) Prior Publication Data

US 2023/0205860 A1      Jun. 29, 2023

(30) Foreign Application Priority Data

Dec. 23, 2021  (JP) ................................ 2021-209538

(51) Int. Cl.
| | | |
|---|---|---|
| *G06F 21/12* | (2013.01) | |
| *G06F 21/10* | (2013.01) | |
| *G06F 21/33* | (2013.01) | |
| G06F 15/16 | (2006.01) | |
| G06F 21/44 | (2013.01) | |

(52) U.S. Cl.
CPC ............. *G06F 21/33* (2013.01); *G06F 21/10* (2013.01)

(58) Field of Classification Search
CPC .......... G06F 21/33; G06F 21/10; G06F 21/12; G06F 21/121
See application file for complete search history.

(56) References Cited

U.S. PATENT DOCUMENTS

| | | | | |
|---|---|---|---|---|
| 2009/0228982 A1* | 9/2009 | Kobayashi | ............ | G06F 21/105 726/26 |
| 2018/0144109 A1* | 5/2018 | Kamakura | ............ | G06F 21/121 |

FOREIGN PATENT DOCUMENTS

| | | | | |
|---|---|---|---|---|
| EP | 1933251 B1 * | 11/2014 | ............. | G06F 21/12 |
| JP | 2004-303210 | 10/2004 | | |
| JP | 2013-008374 | 1/2013 | | |
| JP | 2013109544 A * | 6/2013 | ............. | G06F 21/10 |

OTHER PUBLICATIONS

Yijia Yu, Wenhao Huang, Chen Zhang; "A New Centralized License Management Framework based on Internet of Things (IoT-CLMF)"; SPML '24: Proceedings of the 2024 7th International Conference on Signal Processing and Machine Learning; ACM; Jul. 12-14, 2024, pp. 328-334 (Year: 2024).*

* cited by examiner

*Primary Examiner* — Shewaye Gelagay
*Assistant Examiner* — Courtney D Fields
(74) *Attorney, Agent, or Firm* — IPUSA, PLLC

(57) ABSTRACT

An information processing apparatus includes circuitry to read identification information of an application and a program of the application from a recording medium; generate license information using unique information assigned to the information processing apparatus, the identification information, and the program; and store the generated license information in the recording medium. The license information is for using the application on the information processing apparatus.

7 Claims, 7 Drawing Sheets

LICENSE AUTHENTICATION SCREEN

Perform license authentication of application. Please press EXECUTE button after inserting recording medium storing license information.

INFORMATION PROCESSING APPARATUS, INFORMATION PROCESSING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-209538, filed on Dec. 23, 2021, in the Japan Patent Office, the entire disclosure of which is hereby incorporated by reference herein.

BACKGROUND

Technical Field

Embodiments of the present discloser relate to an information processing apparatus, an information processing method, and a non-transitory recording medium.

Related Art

For license management, a license is issued to an application installed in an electronic apparatus, such as an image forming apparatus, or an information processing apparatus and license authentication is performed when the application is used. For example, an image forming apparatus acquires license information generated by a license server connected to a communication network.

SUMMARY

In one aspect, an information processing apparatus includes circuitry to read identification information of an application and a program of the application from a recording medium; generate license information using unique information assigned to the information processing apparatus, the identification information, and the program; and store the generated license information in the recording medium. The license information is for using the application on the information processing apparatus.

In another aspect, an information processing method includes reading, with an information reader, identification information of an application and a program of the application from a recording medium; generating license information using unique information assigned to the information processing apparatus, the identification information, and the program; and storing the generated license information in the recording medium. The license information is for using the application on the information processing apparatus.

In another aspect, a non-transitory recording medium stores a plurality of program codes which, when executed by one or more processors, causes the processors to perform the method described above.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
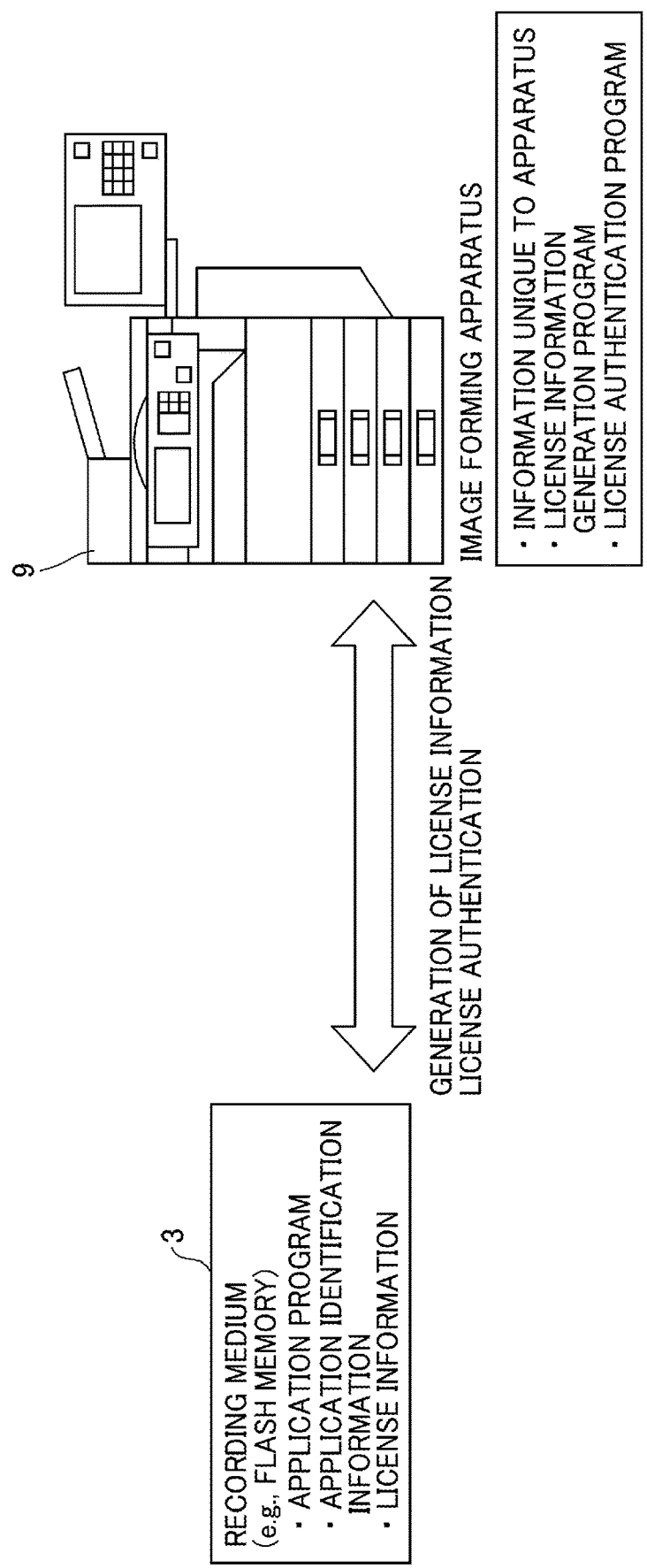
FIG. 1 is a schematic diagram of an example of an image forming apparatus according to one embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given below of an information processing apparatus, an image processing apparatus, an information processing method, and a non-transitory recording medium storing program codes according to the present disclosure, with reference to the accompanying drawings.

FIG. 1 is a schematic diagram of an example of an image forming apparatus (an example of an information processing apparatus and an image processing apparatus) according to an embodiment of the present disclosure. FIG. 1 illustrates an image forming apparatus 9 that has basic functions such as a copy function, a print function, and a scan function, and optional functions can be introduced to image forming apparatus 9 in accordance with user's needs. Examples of functions to be added include a function such as optical character recognition (OCR) for recognizing characters included in a scanned image. These functions are realized as a central processing unit (CPU) executes applications installed in the image forming apparatus 9 to realize the respective functions. Each image forming apparatus 9 has unique information assigned thereto. The image forming apparatus 9 can read and write a program of an application, license information of the application, and the like from and to a recording medium 3 such as a flash memory. Each application has identification information for identifying the individual application from multiple applications that provide different functions.

In the present embodiment, the image forming apparatus 9 generates license information using unique information of the image forming apparatus 9, identification information of an application, and a program of the application, and stores the generated license information in the recording medium 3 as an electronic file. In this disclosure, "application" refers to application software that includes, at least, a program of an application and information on the application. "Using a program of an application for generating license information" refers to using, as information, binary data obtained by reading a program of the application (specifically, an executable electronic file of the program). Further, the image forming apparatus 9 executes license authentication using the generated license information, for example, when the application is used for the first time.

If the license information of an application to be used on an information processing apparatus is generated by an external license server, the license information is not available for an information processing apparatus that is not connected to a communication network.

By contrast, the image forming apparatus 9 does not need to communicate with an external apparatus such as a license server via a communication network at the time of generation of license information and execution of license authentication. However, the image forming apparatus 9 may have a function of communicating with an external apparatus via a communication network. The image forming apparatus 9 may be a single-function apparatus having a print function or a scan function, or may be an electronic apparatus, such as a personal computer, a smartphone, an electronic whiteboard, or a projector, or an image processing apparatus. Hereinafter, an apparatus such as the image forming apparatus 9 or an electronic apparatus according to the present embodiment may be collectively referred to as an information processing apparatus. The license information may be referred to as signature information, and the license information stored in the recording medium 3 may be referred to as a license file or a signature file.

Hardware Configuration

Figure 2:
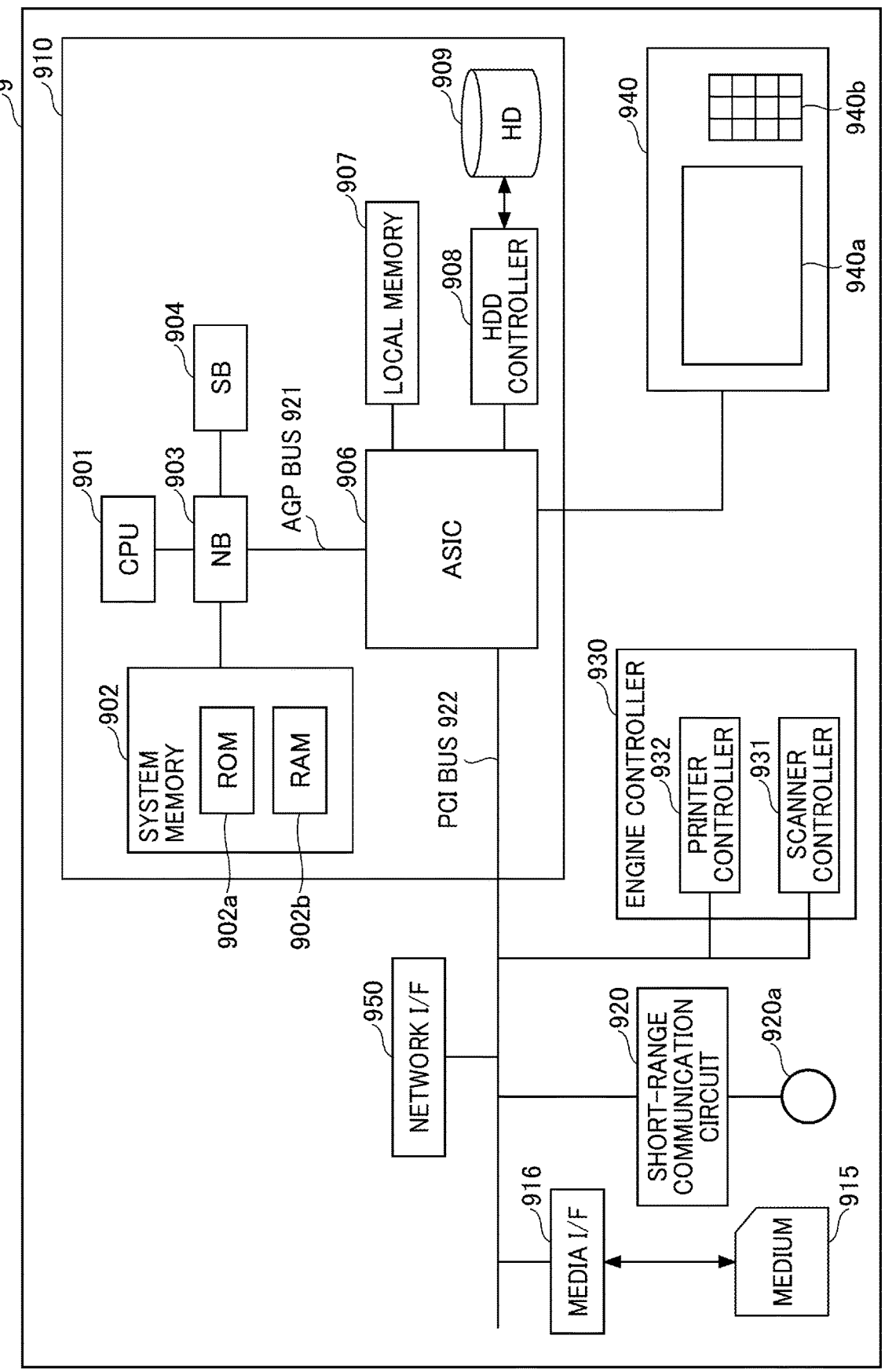
FIG. 2 is a block diagram illustrating an example of a hardware configuration of the image forming apparatus according to one embodiment.

FIG. 2 is a block diagram illustrating an example of a hardware configuration of the image forming apparatus 9 according to the present embodiment. The image forming apparatus 9 may be referred to as a multifunction peripheral (MFP). The acronym "MFP" also represents a multifunction product and a multifunction printer. As illustrated in FIG. 2, the image forming apparatus 9 includes a controller 910, a media interface (I/F) 916, a short-range communication circuit 920, an engine controller 930, a control panel 940, and a network I/F 950.

The controller 910 includes a CPU 901 as a main processor, a system memory 902, a north bridge (NB) 903, a south bridge (SB) 904, an application specific integrated circuit (ASIC) 906, a local memory 907, a hard disk drive (HDD) controller 908, and a hard drive (HD) 909. The NB 903 and the ASIC 906 are connected by an accelerated graphics port (AGP) bus 921.

The CPU 901 controls the entire operation of the image forming apparatus 9. The NB 903 connects the CPU 901, with the system memory 902, SB 904, and AGP bus 921. The NB 903 includes a memory controller for controlling reading or writing of various data with respect to the system memory 902, a Peripheral Component Interconnect (PCI) master, and an AGP target.

The system memory 902 includes a read only memory (ROM) 902*a* and a random access memory (RAM) 902*b*. The ROM 902*a* stores data and program for implementing various functions of the controller 910. The RAM 902*b* is used to load the program and the data. The RAM 902*b* is also used as a memory for loading drawing data for printing.

For the purpose of distribution, the program stored in the RAM 902*b* can be stored in any computer-readable recording medium, such as a compact disc-read only memory (CD-ROM), a compact disc-recordable (CD-R), or a digital versatile disk (DVD), in a file format installable or executable by a computer.

The SB 904 is a bridge that connects the NB 903 with a PCI device or a peripheral device. The ASIC 906 is an integrated circuit (IC) dedicated to an image processing use and having a hardware element for image processing. The ASIC 906 connects the AGP bus 921, a PCI bus 922, the HDD controller 908, and the local memory 907. The ASIC 906 includes a PCI target, an AGP master, an arbiter (ARB) as a central processor of the ASIC 906, a memory controller to control the local memory 907, a plurality of direct memory access controllers (DMACs), and a PCI unit. The DMACs converts coordinates of image data with a hardware logic, to rotate the image data.

The PCI unit transfers data between a scanner controller 931 and a printer controller 932 through the PCI bus 922. The ASIC 906 may be connected to a universal serial bus (USB) interface, or the Institute of Electrical and Electronics Engineers 1394 (IEEE1394) interface.

The short-range communication circuit 920 includes a card reader 920*a* (information reader) for reading authentication information of a user stored in an integrated circuit (IC) card or the like.

The control panel 940 includes a touch panel 940*a* and a numeric keypad 940*b* for receiving an input from a user. Further, the touch panel 940*a* displays a window of an application executed by the image forming apparatus 9.

The media I/F 916 controls reading and writing (storing) of data from and to a recording medium 915 such as a flash memory.

Functions

Figure 3:
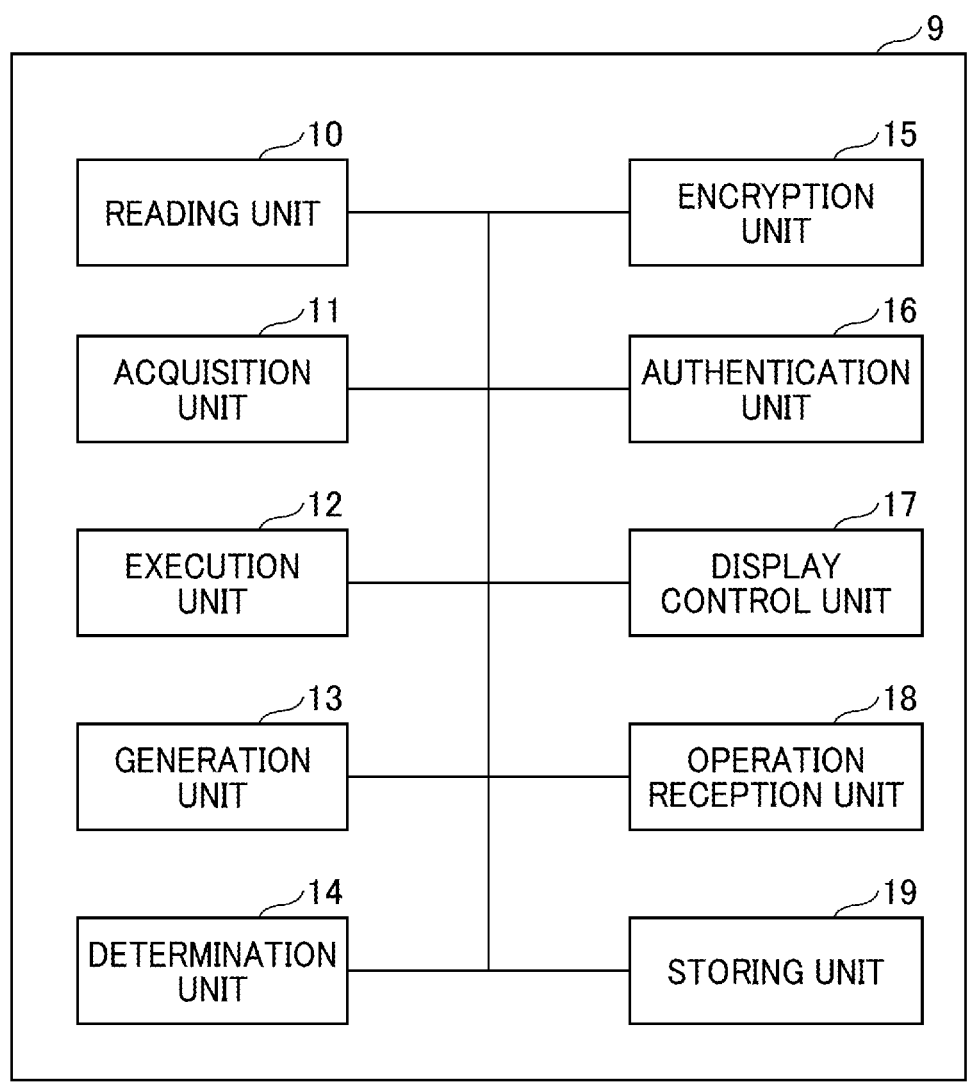
FIG. 3 is a block diagram illustrating an example of a functional configuration of the image forming apparatus according to one embodiment.

FIG. 3 is a block diagram illustrating an example of a functional configuration of the image forming apparatus 9 according to the present embodiment. The image forming apparatus 9 includes a reading unit 10, an acquisition unit 11, an execution unit 12, a generation unit 13, a determination unit 14, an encryption unit 15, an authentication unit 16, a display control unit 17, an operation reception unit 18, and a storing unit 19. These functional units provide functions implemented by the CPU 901 (see FIG. 2) executing instructions included in one or more programs installed on the image forming apparatus 9. The storing unit 19 is implemented by, for example, the CPU 901 executing instructions included in one or more programs, a storage device including the media I/F 916 and the recording medium 915 (an example of memory) of the image forming apparatus 9. A description is given below of each functional unit.

The reading unit 10 reads a program for generating license information and executing license authentication, identification information of an application used in the image forming apparatus 9, and the program (program file) of the application from the recording medium 3 inserted into the card reader 920*a* of the image forming apparatus 9.

Further, the reading unit 10 reads license information and the like stored in the recording medium 3 by the storing unit 19.

The acquisition unit 11 acquires unique information of the image forming apparatus 9 stored in the image forming apparatus 9. The unique information is information uniquely assigned to the individual apparatus, and different unique information is assigned to different apparatuses.

The execution unit 12 executes a license information generation program for generating license information and a license authentication program for performing license authentication.

The generation unit 13 generates a message digest for generating license information, using the unique information of the image forming apparatus 9, the identification information of the application, and the program of the application. Details of a method for generating the message digest will be described later. In addition, the generation unit 13 generates license information by encrypting the generated message digest. The generation unit 13 further generates a message digest by decrypting the encrypted license information.

The determination unit 14 determines the validity of the identification information of the application. Details are to be described later.

The encryption unit 15 generates an encryption key for encrypting the message digest generated by the generation unit 13 and an encryption key for decrypting the encryption.

The authentication unit 16 performs license authentication using the message digest generated by the generation unit 13 and the message digest generated from the license information read from the recording medium 3. Details of a method for executing license authentication will be described later.

The display control unit 17 displays, on the image forming apparatus 9, a license information generation screen, a license authentication screen, and the like.

The operation reception unit 18 receives an operation such as pressing of a confirmation button by the user via the touch panel 940a of the image forming apparatus 9.

The storing unit 19 stores the license information generated by the generation unit 13 in the recording medium 3. Further, the storing unit 19 stores, in the storage device (e.g., the recording medium 915) of the image forming apparatus 9, the identification information of the application and the program of the application read from the recording medium 3.

License Information Generation

Figure 4:
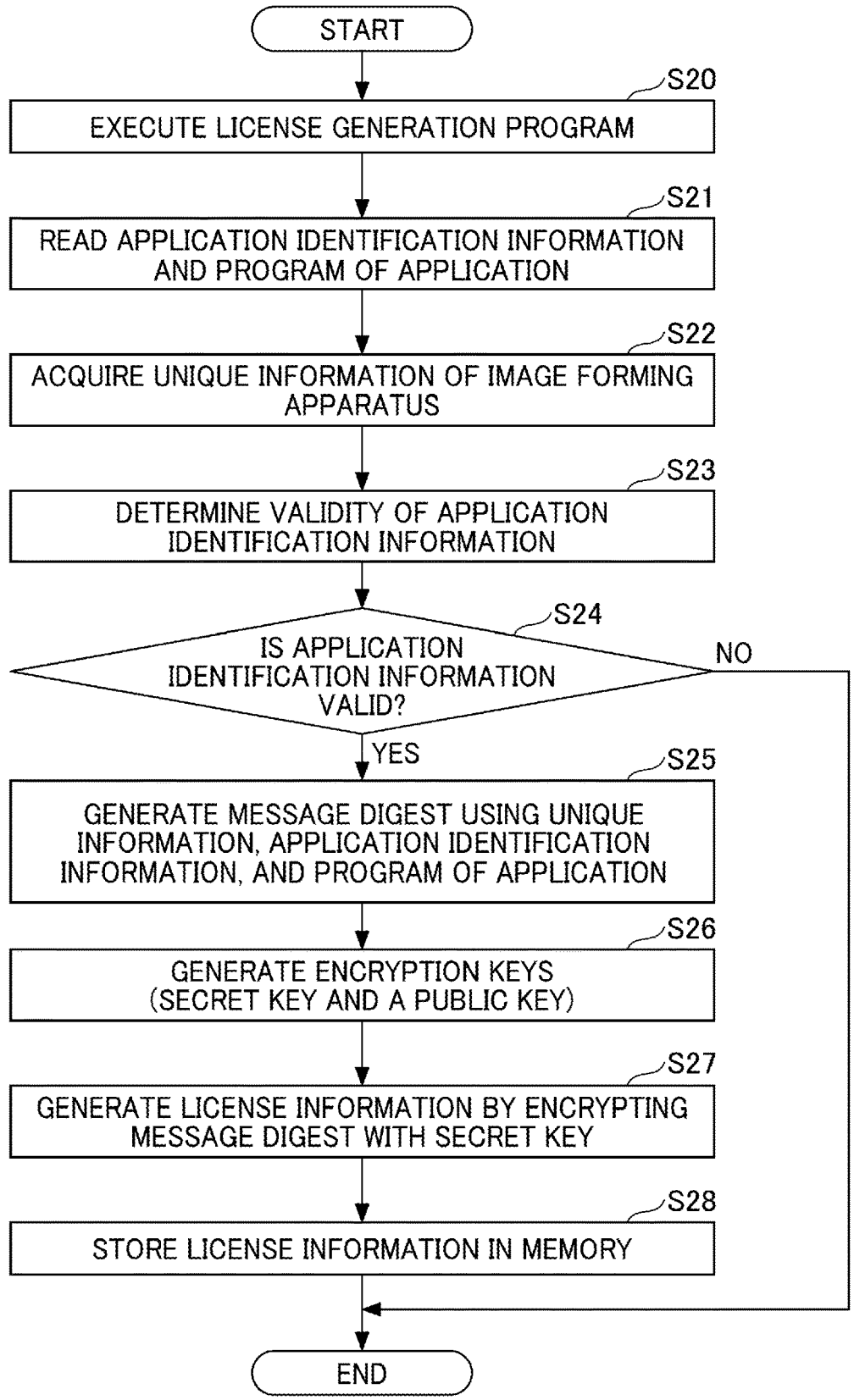
FIG. 4 is a flowchart of an example of a sequence of operation related to license information generation according to one embodiment.

FIG. 4 is a flowchart of an example of a sequence of operation related to license information generation according to the present embodiment. In this sequence, the image forming apparatus 9 generates license information using unique information of the image forming apparatus 9, identification information of an application, and a program of the application, and stores the generated license information in the recording medium 3. The image forming apparatus 9 reads the identification information of the application and the program of the application from the recording medium 3. Further, unique information assigned to each apparatus is stored in the image forming apparatus 9, and the acquisition unit 11 of the image forming apparatus 9 acquires the unique information as necessary. The storage device of the image forming apparatus 9 stores the license information generation program to be executed for generating the license information. A description is given below of the steps in FIG. 4.

Figure 5:
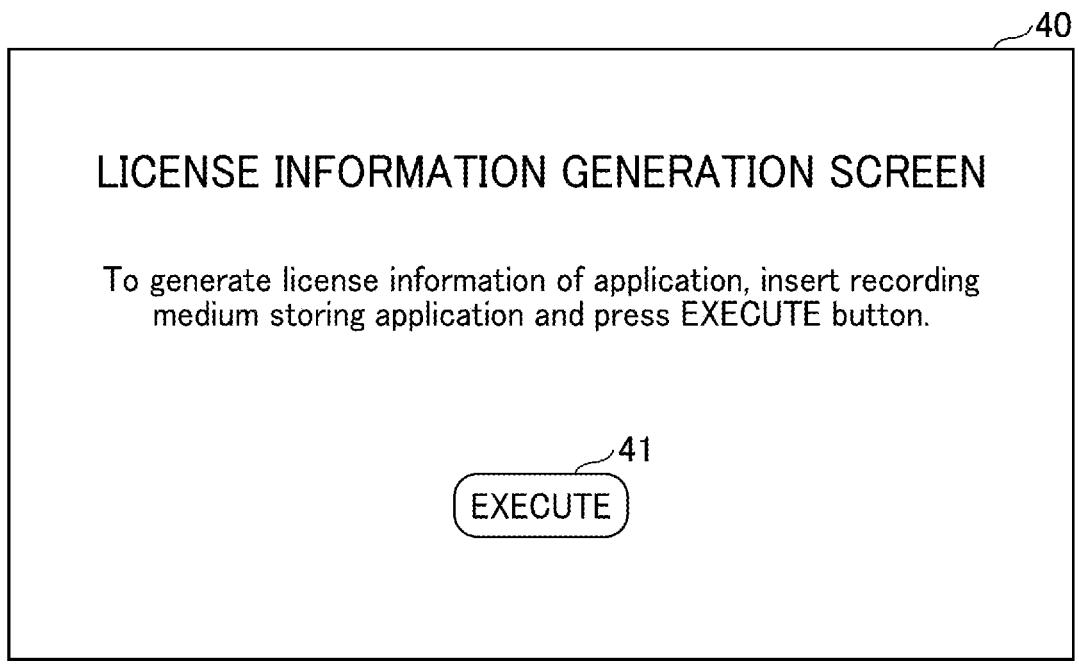
FIG. 5 is a diagram illustrating an example of a license information generation screen according to one embodiment.

Step S20: The display control unit 17 of the image forming apparatus 9 displays a screen for receiving an operation for starting generation of license information on, for example, the touch panel 940a of the image forming apparatus 9. FIG. 5 is a diagram illustrating a license information generation screen 40 according to the present embodiment. The license information generation screen 40 illustrated in FIG. 5 displays a message for prompting the user to press an "execute" button 41 after the user inserts the recording medium 3 storing the program of the application, into the card reader 920a of the image forming apparatus 9, in order to generate the license information for using the application. The operation reception unit 18 of the image forming apparatus 9 receives an operation of pressing the "execute" button 41 by the user. The execution unit 12 of the image forming apparatus 9 executes the license information generation program for generating the license information. Description with reference to FIG. 4 is continued.

Step S21: The reading unit 10 of the image forming apparatus 9 reads the identification information of the application and the program of the application from the recording medium 3. The storing unit 19 of the image forming apparatus 9 stores the read identification information of the application and the program of the application in the storage device of the image forming apparatus 9.

Step S22: The acquisition unit 11 of the image forming apparatus 9 acquires the unique information of the image forming apparatus 9 stored in a memory of the image forming apparatus 9.

Step S23: The determination unit 14 of the image forming apparatus 9 determines the validity of the identification information of the application read in step S21. The identification information of the application includes information such as a model name of the image forming apparatus 9 on which the application operates. Therefore, the determination unit 14 determines the validity of the identification information by, for example, determining whether or not the model name of the image forming apparatus 9 that executes generation of the license information matches the model name included in the identification information of the application.

Step S24: In a case where the determination unit 14 of the image forming apparatus 9 determines that the identification information of the application is valid (Yes in S24), the process proceeds to step S25. Otherwise (No in S24), the determination unit 14 ends the license information generation.

Step S25: The generation unit 13 of the image forming apparatus 9 generates a message digest using the unique information of the image forming apparatus 9, the identification information of the application, and the program of the application. The generation unit 13 inputs, to a hash function, information obtained by combining the unique information of the image forming apparatus 9, the identification information of the application, and the program of the application, and generates a message digest as an output thereof. Examples of hash function include Message Digest Algorithm 5 (MD5) and Secure Hash Algorithm (SHA)-256. SHA-256 outputs data (hash value) having a size of 256 bits (32 bytes) is output. Although the size of a program of an application is large, the size of output data is constant regardless of the size of input data to the hash function.

Step S26: The encryption unit 15 of the image forming apparatus 9 generates encryption keys for generating license information. The encryption unit 15 generates, as encryption keys, for example, a secret key and a public key used in public key cryptography such as Rivest-Shamir-Adleman (RSA) method.

Step S27: The generation unit 13 of the image forming apparatus 9 generates license information by encrypting the message digest generated in step S25 using the secret key generated in step S26.

Step S28: The storing unit 19 of the image forming apparatus 9 stores the generated license information in the recording medium 3.

With the above-described processing, the image forming apparatus 9 can generate license information using the unique information of the image forming apparatus 9, the identification information of the application, and the program of the application without connecting to an external apparatus via the communication network.

License Authentication Processing

Figure 6:
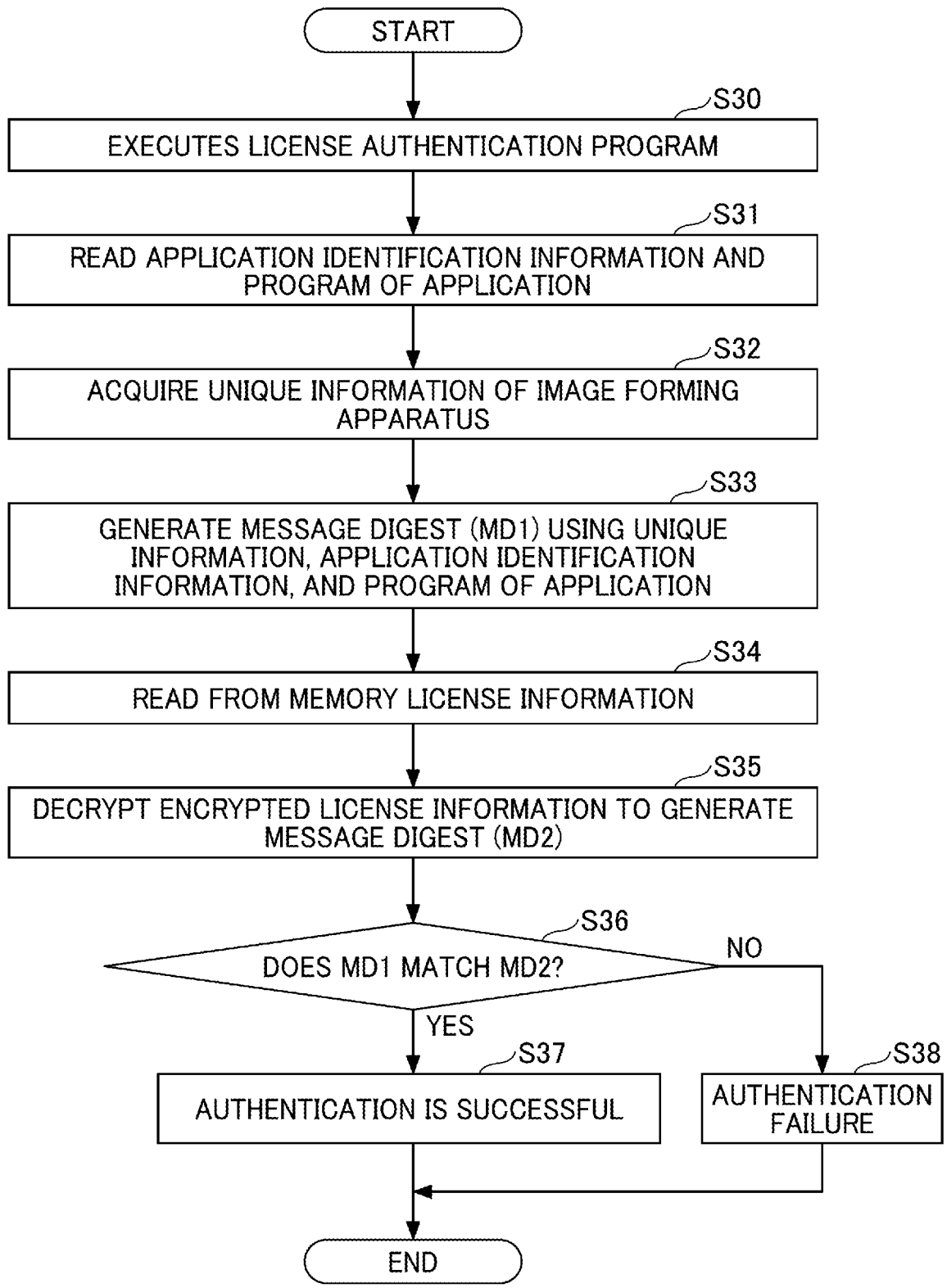
FIG. 6 is a flowchart of an example of a sequence of operation related to license authentication according to one embodiment.

FIG. 6 is a flowchart of an example of a sequence of operation relating to license authentication according to the present embodiment. In this sequence, the image forming apparatus 9 performs license authentication using the license information stored in the recording medium 3, the unique information of the image forming apparatus 9, the identification information of the application, and the program of the application. Similar to the case of the license information generation illustrated in FIG. 4, the image forming apparatus 9 reads the identification information of the application and the program of the application from the recording medium 3. Alternatively, the image forming apparatus 9 may acquire the identification information of the application and the program of the application from the storage device of the image forming apparatus 9. The image forming apparatus 9 further acquires the unique information individually assigned to the image forming apparatus 9. The license authentication is performed, for example, when an application is made available (also referred to as activation) or used for the first time in the image forming apparatus 9. The license authentication program for executing the license authentication is stored in the image forming apparatus 9. A description is given below of the steps in FIG. 6.

Figure 7:
FIG. 7 illustrates an example of a license authentication screen according to one embodiment.

Step S30: The display control unit 17 of the image forming apparatus 9 displays a license authentication screen for receiving an operation for starting license authentication on, for example, the touch panel 940a of the image forming apparatus 9. FIG. 7 illustrates a license authentication screen 42 according to the present embodiment. The license authentication screen 42 illustrated in FIG. 7 displays a message for prompting the user to press an "execute" button 43 after the user inserts the recording medium 3 storing the license information, into the card reader 920a of the image forming apparatus 9, in order to execute the license authentication for using the application. The operation reception unit 18 of the image forming apparatus 9 receives an operation of pressing the "execute" button 43 by the user. The execution unit 12 of the image forming apparatus 9 executes the license authentication program for executing license authentication. Description with reference to FIG. 6 is continued.

Step S31: The reading unit 10 of the image forming apparatus 9 reads the identification information of the application and the program of the application from the recording medium 3. Alternatively, the reading unit 10 of the image forming apparatus 9 may read the identification information of the application and the program of the application stored in the storage device of the image forming apparatus 9.

Step S32: The acquisition unit 11 of the image forming apparatus 9 acquires the unique information of the image forming apparatus 9 stored in the memory of the image forming apparatus 9.

Step S33: The generation unit 13 of the image forming apparatus 9 generates a message digest (referred to as MD1) using the unique information of the image forming apparatus 9, the identification information of the application, and the program of the application. The generation unit 13 generates the message digest (MD1) in a process similar to the process in step S25 of FIG. 4.

Step S34: The reading unit 10 of the image forming apparatus 9 reads the license information from the recording medium 3.

Step S35: The generation unit 13 of the image forming apparatus 9 decrypts the encrypted license information read in step S34 using the public key generated in step S26 in FIG. 4, to generate a message digest (referred to as MD2).

Step S36: The authentication unit 16 of the image forming apparatus 9 checks whether the message digest (MD1) generated in step S33 matches the message digest (MD2) generated in step S35, thereby performing license authentication. When the message digests (MD1 and MD2) match each other, the authentication unit 16 of the image forming apparatus 9 proceeds to step S37. Otherwise (MD1 does not match MD2), the authentication unit 16 proceeds to step S38.

Step S37: The authentication unit 16 of the image forming apparatus 9 determines that the license authentication is successful. The display control unit 17 of the image forming apparatus 9 may display a message indicating that the license authentication is successful on, for example, the touch panel 940a of the image forming apparatus 9.

Step S38: The authentication unit 16 of the image forming apparatus 9 determines that the license authentication has failed. The display control unit 17 of the image forming apparatus 9 may display a message that the license authentication has failed on, for example, the touch panel 940a of the image forming apparatus 9.

With the above-described processing, the image forming apparatus 9 can perform license authentication, using the license information, the unique information of the image forming apparatus 9, the identification information of the application, and the program of the application without connecting to an external apparatus via the communication network. In the license authentication, use of the unique information assigned to each apparatus prevents illegal use of an application in another apparatus.

Embodiments of the present disclosure are not limited to the above-described examples, and various modifications and replacements are possible within the scope not departing from the gist of the present invention.

For example, FIG. 3 is the block diagram of an example in which the functional units are divided into blocks in accordance with main functions of the image forming apparatus 9, in order to facilitate understanding of the processing by the image forming apparatus 9 or the information processing apparatus. The way of dividing processing in units or the name of the processing unit do not limit the scope of the present invention. The processing performed by the image forming apparatus 9 or the information processing apparatus may be divided into a greater number of units depending on the processing details. Alternatively, one unit of processing may be a group of divided processing.

The apparatuses and devices described are merely an illustration of one of several computing environments for implementing the above-described embodiment. In some embodiments, the image forming apparatus 9 or the information processing apparatus includes multiple computing devices, such as a server cluster. The plurality of computing devices communicates with one another through any type of communication link including, for example, a network or a shared memory, and performs the operations described in the present disclosure.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality.

Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing apparatus comprising:
a memory configured to store instructions; and
a hardware processor coupled to the memory and configured to execute the instructions when executed by the hardware processor, the instructions including:
displaying a license information generation screen configured to receive an operation by a user for starting generation of license information in the information processing apparatus;
displaying a message for prompting the user to press an execute button on the license information generation screen after inserting a recording medium, that stores identification information of an application and an application program of the application, into an information reader of the information processing apparatus;
reading the identification information of the application and the application program of the application from the recording medium;
generating license information in the information processing apparatus based on unique information assigned to the information processing apparatus, the identification information, and the application program using a license information generation program stored in a storage device of the information processing apparatus without connecting to an external apparatus via a network, the license information being for using the application on the information processing apparatus; and
storing the generated license information in the recording medium.

2. The information processing apparatus according to claim 1,
wherein the hardware processor is configured to:
input the unique information, the identification information, and the application program to a hash function; and
encrypt output data from the hash function to generate the license information.

3. The information processing apparatus according to claim 1,
wherein the hardware processor is configured to perform license authentication using the license information, the unique information, the identification information, and the application program.

4. The information processing apparatus according to claim 3,
wherein the hardware processor is configured to perform the license authentication by confirming whether a first message digest matches a second message digest, the first message digest being generated from the license information read from the recording medium, the second message digest being generated using the unique information, the identification information, and the application program.

5. The information processing apparatus according to claim 1,
wherein the information processing apparatus is an image processing apparatus, and the hardware processor is configured to perform image processing.

6. An information processing method performed by an information processing apparatus, the method comprising:
displaying a license information generation screen configured to receive an operation by a user for starting generation of license information in the information processing apparatus;
displaying a message for prompting the user to press an execute button on the license information generation screen after inserting a recording medium, that stores identification information of an application and an application program of the application, into an information reader of the information processing apparatus;
reading, with the information reader, the identification information of the application and the application program of the application from the recording medium;
generating license information in the information processing apparatus based on unique information assigned to the information processing apparatus, the identification information, and the application program using a license information generation program stored in a storage device of the information processing apparatus without connecting to an external apparatus via a network, the license information being for using the application on the information processing apparatus; and
storing the generated license information in the recording medium.

7. A non-transitory recording medium storing a plurality of program codes which, when executed by one or more processors, causes the processors to perform a method, the method comprising:
displaying a license information generation screen configured to receive an operation by a user for starting generation of license information in the information processing apparatus;
displaying a message for prompting the user to press an execute button on the license information generation screen after inserting a recording medium, that stores identification information of an application and an application program of the application, into an information reader of the information processing apparatus;
reading, with the information reader, the identification information of the application and the application program of the application from the recording medium;
generating license information in the information processing apparatus based on unique information assigned to an information processing apparatus, the identification information, and the application program using a license information generation program stored in a storage device of the information processing apparatus without connecting to an external apparatus via a network, the license information being for using the application on the information processing apparatus; and
storing the generated license information in the recording medium.

* * * * *